United States Patent
Yeager et al.

(10) Patent No.: US 9,945,251 B2
(45) Date of Patent: Apr. 17, 2018

(54) COOLING ARCHITECTURE FOR TURBINE EXHAUST CASE

(71) Applicant: United Technologies Corporation, Hartford, CT (US)

(72) Inventors: William Yeager, Jupiter, FL (US); John S. Tu, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 387 days.

(21) Appl. No.: 14/443,818

(22) PCT Filed: Dec. 17, 2013

(86) PCT No.: PCT/US2013/075647
§ 371 (c)(1),
(2) Date: May 19, 2015

(87) PCT Pub. No.: WO2014/105515
PCT Pub. Date: Jul. 3, 2014

(65) Prior Publication Data
US 2015/0337682 A1  Nov. 26, 2015

Related U.S. Application Data

(60) Provisional application No. 61/747,226, filed on Dec. 29, 2012.

(51) Int. Cl.
*F01D 25/14* (2006.01)
*F01D 25/16* (2006.01)
(Continued)

(52) U.S. Cl.
CPC ............. *F01D 25/14* (2013.01); *F01D 9/065* (2013.01); *F01D 25/162* (2013.01); *F01D 25/24* (2013.01);
(Continued)

(58) Field of Classification Search
CPC ........ F01D 25/12; F01D 25/14; F01D 25/162; F01D 25/30; F01D 9/065
See application file for complete search history.

(56) References Cited

U.S. PATENT DOCUMENTS

| 4,079,587 A | 3/1978 | Nordstrom et al. |
|---|---|---|
| 5,020,318 A | 6/1991 | Vdoviak |

(Continued)

OTHER PUBLICATIONS

Extended European Search Report, EP Application No. 13869381.7, dated Dec. 8, 2015, 7 pages.

(Continued)

*Primary Examiner* — Igor Kershteyn
*Assistant Examiner* — Brian P Wolcott
(74) *Attorney, Agent, or Firm* — Kinney & Lange, P.A.

(57) ABSTRACT

Cooling a turbine exhaust case (TEC) employed in an industrial gas turbine engine includes supplying cooling airflow from an outer diameter (OD) to an inner diameter (ID) cavity, supplying a secondary airflow having a pressure greater than the pressure of the cooling airflow to the ID cavity for mixing with the cooling airflow to provide a mixed airflow, and directing the mixed airflow in a serpentine cooling path that includes first directing the mixed airflow radially outward via hollow struts to an OD cavity, then radially inward via hollow fairings that surround the hollow struts.

19 Claims, 5 Drawing Sheets

(51) Int. Cl.
  *F01D 25/30* (2006.01)
  *F01D 25/24* (2006.01)
  *F01D 9/06* (2006.01)
  *F02C 7/12* (2006.01)
  *F02C 7/20* (2006.01)

(52) U.S. Cl.
  CPC .............. *F01D 25/30* (2013.01); *F02C 7/12* (2013.01); *F02C 7/20* (2013.01); *F05D 2250/185* (2013.01); *F05D 2260/20* (2013.01); *Y02T 50/675* (2013.01)

(56) References Cited

U.S. PATENT DOCUMENTS

| | | | |
|---|---|---|---|
| 7,055,305 B2 * | 6/2006 | Baxter | F01D 25/145 415/115 |
| 9,279,341 B2 * | 3/2016 | Durocher | F01D 25/125 |
| 2002/0028133 A1 | 3/2002 | Manzoori et al. | |
| 2003/0150205 A1 | 8/2003 | Baxter | |
| 2009/0238678 A1 * | 9/2009 | Nyamu | F01D 5/084 415/116 |
| 2010/0322759 A1 | 12/2010 | Tanioka | |
| 2011/0020116 A1 | 1/2011 | Hashimoto et al. | |
| 2011/0079019 A1 * | 4/2011 | Durocher | F01D 5/082 60/796 |
| 2011/0081237 A1 * | 4/2011 | Durocher | F01D 9/06 415/173.1 |
| 2012/0227371 A1 | 9/2012 | Johnson et al. | |

OTHER PUBLICATIONS

The International Search Report dated Apr. 4, 2014 for International Application No. PCT/US13/75647.

* cited by examiner

COOLING ARCHITECTURE FOR TURBINE EXHAUST CASE

BACKGROUND

The present invention is directed to turbine exhaust cases (TECs) utilized in gas turbine engines, and in particular to cooling architectures associated with the TECs.

Turbine Exhaust Cases (TECs) typically comprise structural frames that support the very aft end of a gas turbine engine. In aircraft applications, the TEC can be utilized to mount the engine to the aircraft airframe. In industrial gas turbine applications, the TEC can be utilized to couple the gas turbine engine to an electrical generator. A typical TEC comprises an outer ring that couples to the outer diameter case of the low pressure turbine, an in inner ring that surrounds the engine centerline so as to support shafting in the engine, and a plurality of struts connecting the inner and outer rings.

The components of the TEC are exposed to very high temperatures associated with the gas path. Various approaches and architectures are employed to handle the high temperatures. For example, components of the TEC may utilize materials capable of handling the high temperature associated with the gas path., may utilize various shielding materials (e.g., heat shields, fairings) to surround and protect structural components from the high temperatures associated with the gas path, and/or may cool air to regulate the temperature of the various TEC components. Typically, cooling airflow provided by a heat exchanger is provided via an outer diameter of the TEC, which provides cooling air flow to the inner ring and components associated with the inner ring.

SUMMARY

Cooling a turbine exhaust case (TEC) employed in an industrial gas turbine engine includes supplying cooling airflow from an outer diameter (OD) to an inner diameter (ID) cavity. A secondary airflow having a pressure greater than the pressure of the cooling airflow is supplied to the ID cavity for mixing with the cooling airflow to provide a mixed airflow. The mixed airflow is directed in a serpentine cooling path that includes first directing the mixed airflow radially outward via hollow frame struts to an OD cavity, then radially inward via hollow fairing struts that surround the hollow frame struts.

DETAILED DESCRIPTION

Figure 1:
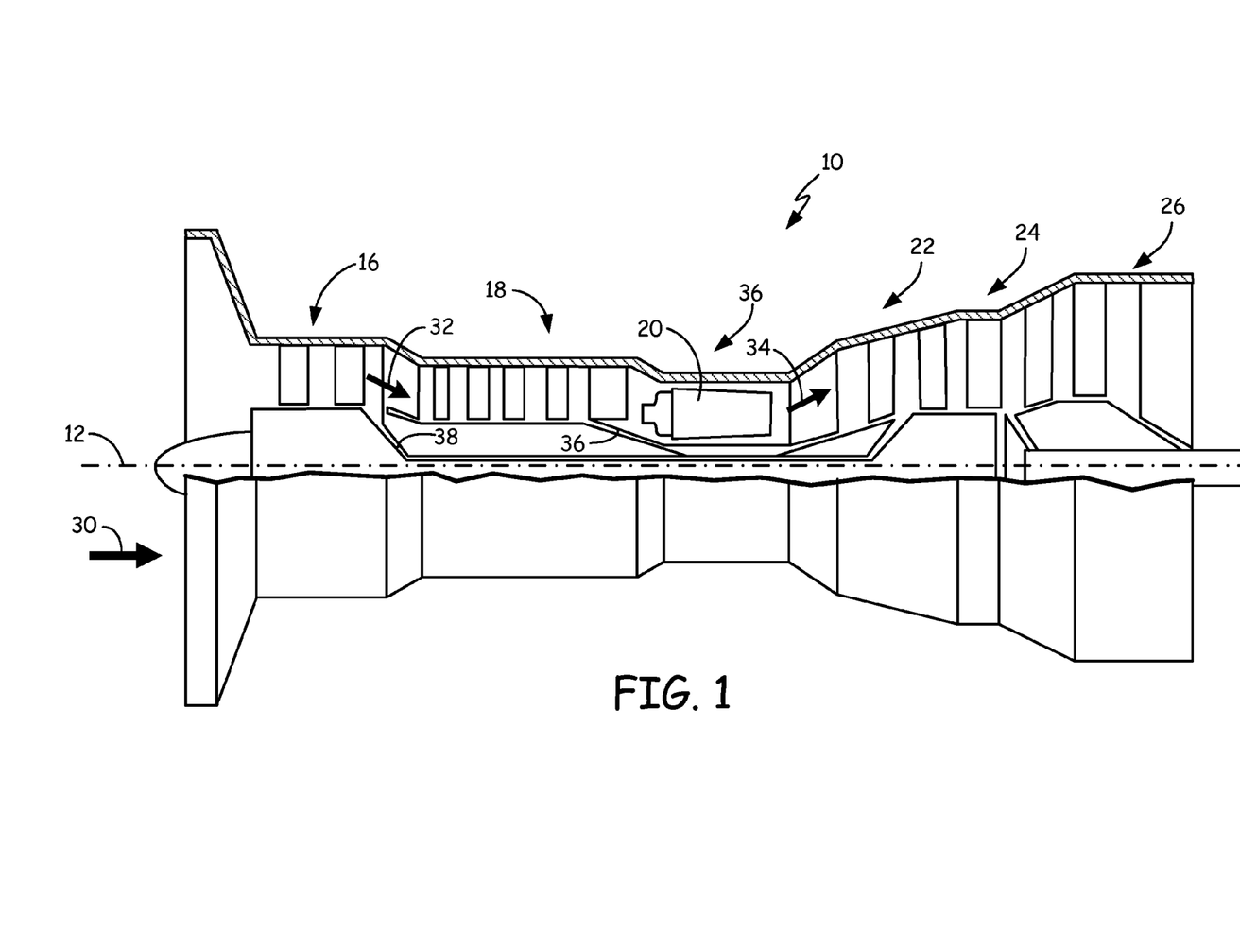
FIG. 1 is a side sectional schematic view of an industrial gas turbine engine having a turbine exhaust case.

FIG. 1 is a side partial sectional schematic view of gas turbine engine 10. In the illustrated embodiment, gas turbine engine 10 is an industrial gas turbine engine circumferentially disposed about a central, longitudinal axis or axial engine centerline axis 12 as illustrated in FIG. 1. Gas turbine engine 10 includes, in series order from front to rear, low pressure compressor section 16, high pressure compressor section 18, combustor section 20, high pressure turbine section 22, and low pressure turbine section 24. In some embodiments, power turbine section 26 is a free turbine section disposed aft of the low pressure turbine 24.

As is well known in the art of gas turbines, incoming ambient air 30 becomes pressurized air 32 in the low and high pressure compressor sections 16 and 18. Fuel mixes with pressurized air 32 in combustor section 20, where it is burned. Once burned, combustion gases 34 expand through high and low pressure turbine sections 22 and 24 and through power turbine section 26. High and low pressure turbine sections 22 and 24 drive high and low pressure rotor shafts 36 and 38 respectively, which rotate in response to flow of combustion gases 34 and thus rotate the attached high and low pressure compressor sections 18 and 16. Power turbine section 26 may, for example, drive an electrical generator, pump, or gearbox (not shown).

Low Pressure Turbine Exhaust Case (LPTEC) 40 is positioned between low pressure turbine section 24 and power turbine section 26. LPTEC 40 defines a flow path for gas exhausted from low pressure turbine section 24 that is conveyed to power turbine 26. LPTEC 40 also provides structural support for gas turbine engine 10 so as to provide a coupling point for power turbine section 26. LPTEC 40 is therefore rigid and structurally strong. The present invention relates generally to a cooling architecture for maintaining components of LPTEC 40 within allowed operating parameters.

It is understood that FIG. 1 provides a basic understanding and overview of the various sections and the basic operation of an industrial gas turbine engine. It will become apparent to those skilled in the art that the present application is applicable to all types of gas turbine engines, including those with aerospace applications. Similarly, although the present disclosure is described with reference to a cooling architecture for LPTEC 40, the present invention is applicable to other components of gas turbine engines, such as intermediate cases, mid-turbine frames and the like.

Figure 2A:
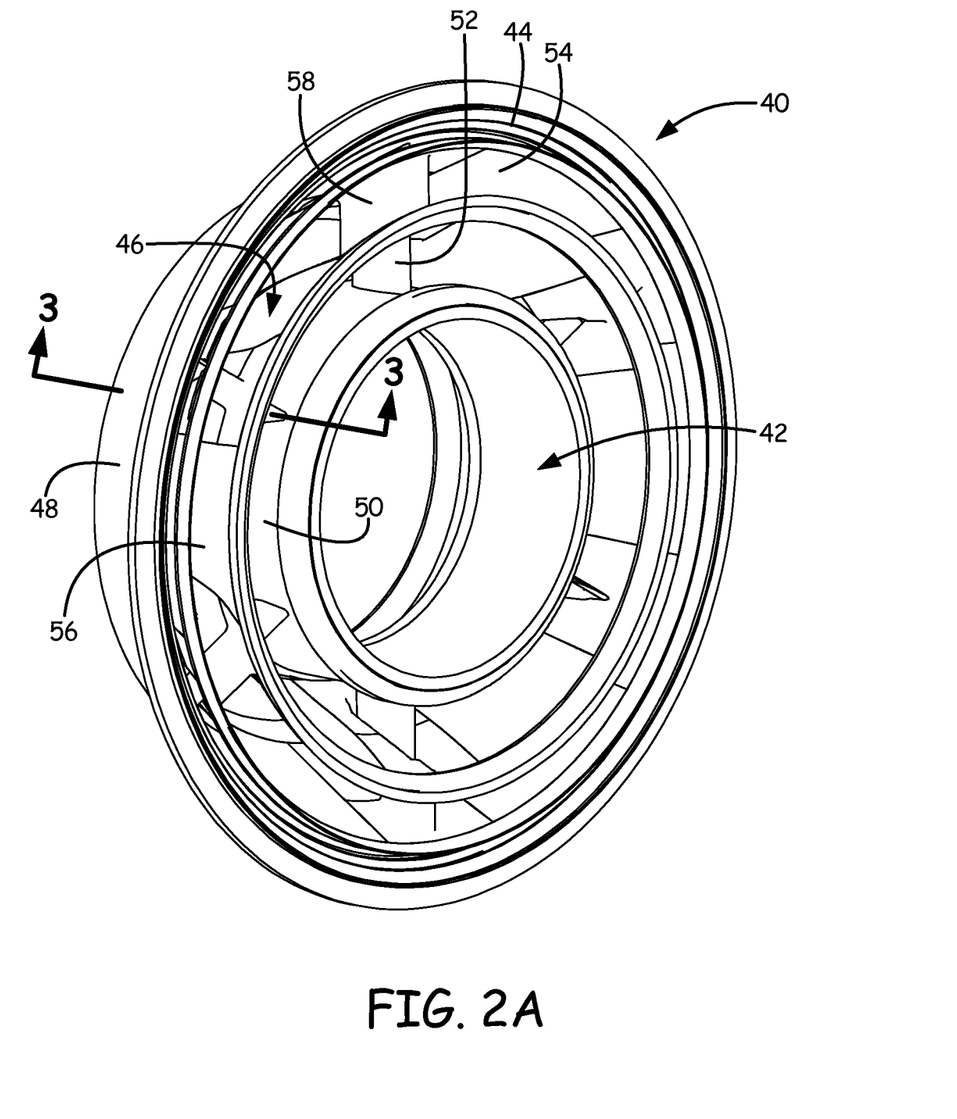
FIG. 2A is a perspective view of a turbine exhaust case in which a ring-strut-ring fairing is assembled with a ring-strut-ring frame.
Figure 2B:
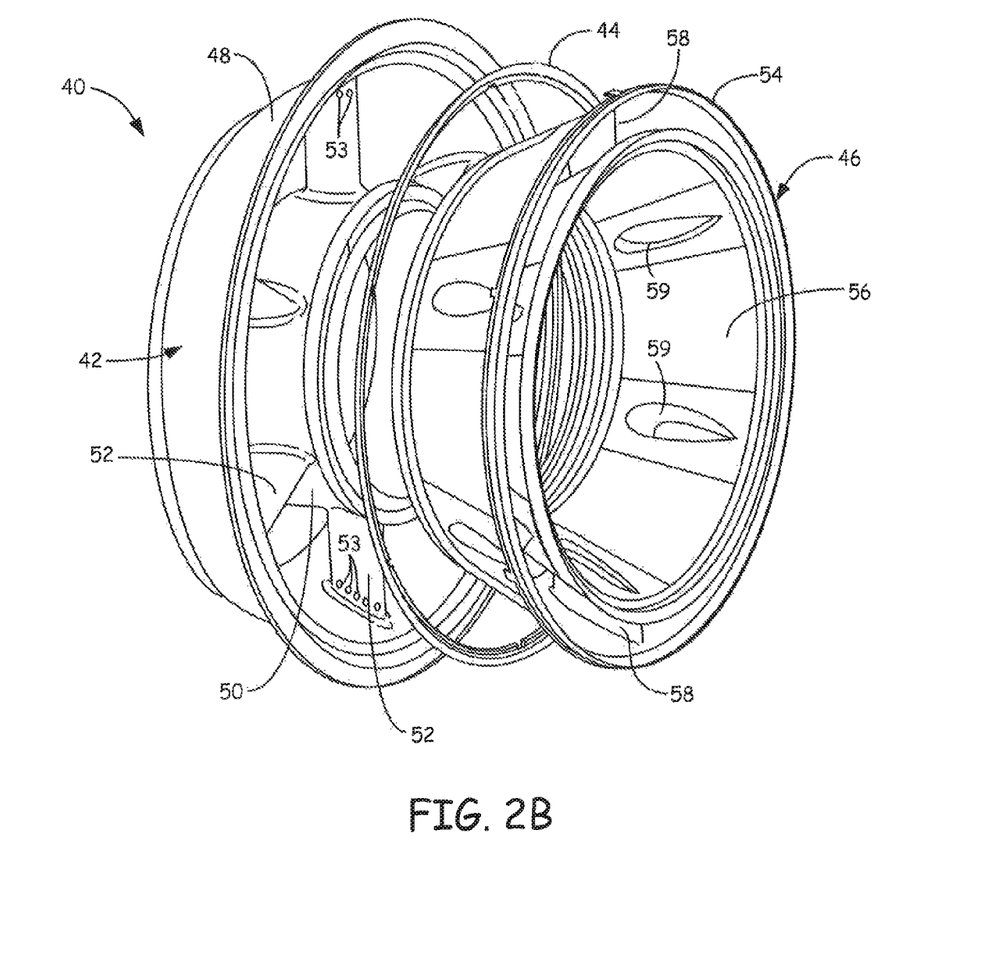
FIG. 2B is an exploded view of the turbine exhaust case of FIG. 2A showing the frame, the fairing and a circumferential stop ring.

FIG. 2A shows a perspective view of Low Pressure Turbine Exhaust Case (LPTEC) 40, which includes frame 42, annular mount 44, and fairing 46. FIG. 2B, which is discussed concurrently with FIG. 2A, shows an exploded view of LPTEC 40 showing annular mount 44 disposed between fairing 46 and frame 42. Frame 42 includes outer ring 48, inner ring 50, and struts 52. Fairing 46 includes fairing outer ring 54, fairing inner ring 56, and fairing struts 58.

Frame 42 comprises a ring-strut-ring structure that defines a gas path between outer ring 48 and inner ring 50. Fairing 46 also comprises a ring-strut-ring structure that is mounted within frame 42 to line the gas path and protect frame 42 from high temperature exposure. In one embodiment, fairing 46 can be built around frame 42, and in another embodiment, frame 42 is built within fairing 46.

Frame 42 comprises a stator component of gas turbine engine 10 (FIG. 1) that is typically mounted between low pressure compressor section 24 and power turbine section 26. In the embodiment shown, outer ring 48 of frame 42 is conically shaped, while inner ring 50 is cylindrically shaped. Outer ring 48 is connected to inner ring 50 via struts 52. Outer ring 48, inner ring 50 and struts 52 form a portion of the gas flow path through gas turbine engine 10 (FIG. 1).

Specifically, outer ring 48 and inner ring 50 define the outer and inner radial boundaries of an annular flow path between low pressure turbine section 24 and power turbine section 26 (FIG. 1), while struts 52 intermittently interrupt the annular flow path. In the embodiment shown in FIG. 2B, struts 52 include a plurality of holes or apertures 53 that allow airflow provided through the hollow portion of struts 52 to be communicated into the outer diameter (OD) cavity between outer ring 48 and fairing outer ring 54.

Fairing 46 is adapted to be disposed within frame 42 between outer ring 48 and inner ring 50. Fairing outer ring 54 and fairing inner ring 56 of fairing 46 have generally conical shapes, and are connected to each other by fairing struts 58. Fairing outer ring 54, fairing inner ring 56, and fairing struts 58, form a liner for the portion of the gas flow path through frame 42. Specifically, fairing struts 58 encase struts 52, while fairing outer ring 54 and fairing inner ring 56 line inward facing surfaces of outer ring 48 and inner ring 50, respectively. Fairing struts 58 are hollow, with openings 59 that open into the OD cavity between outer ring 48 and fairing outer ring 54 and into an inner diameter (ID) chamber between inner ring 50 and fairing inner ring 56.

Figure 3:
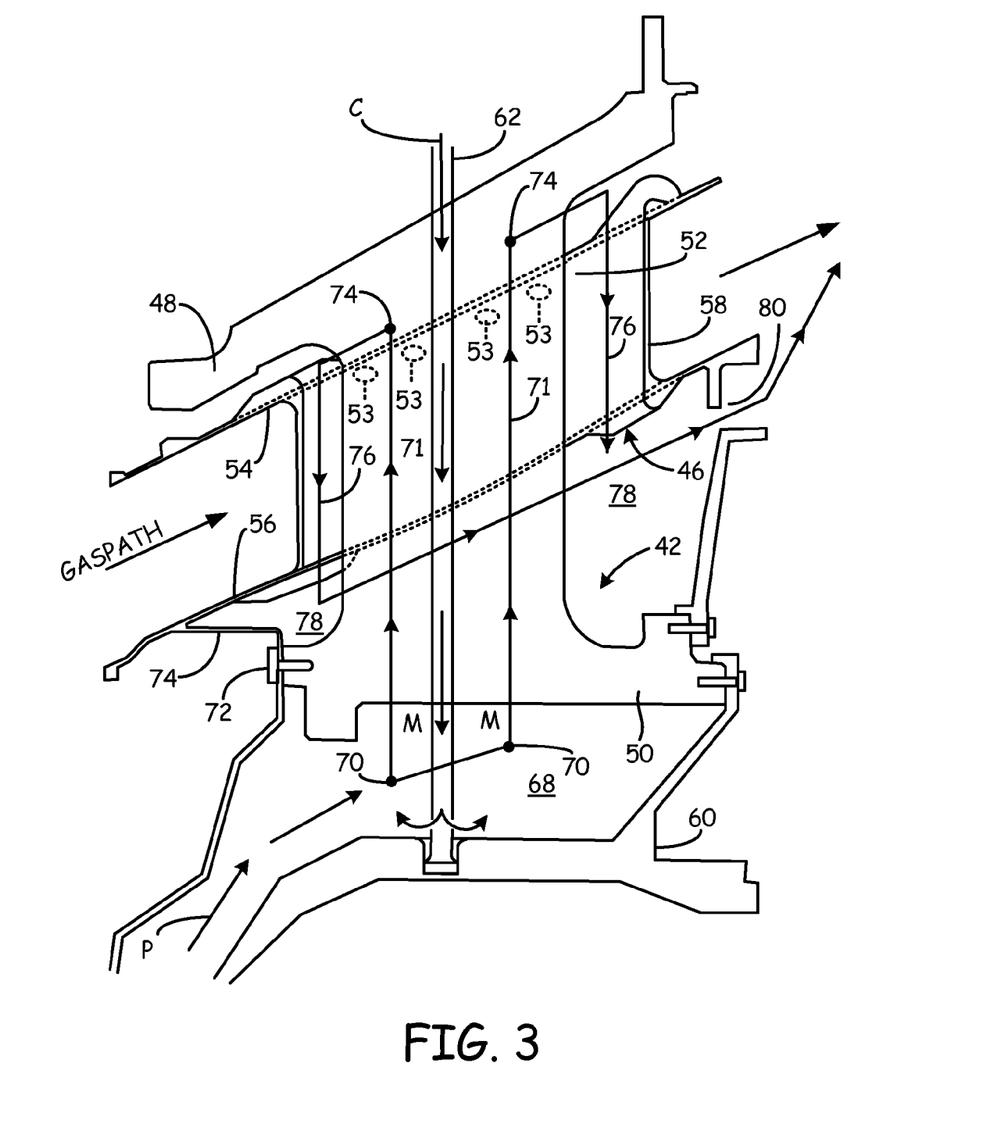
FIG. 3 is a cross-sectional view of the turbine exhaust case taken along line 3-3 shown in FIG. 2A.

FIG. 3 is a cross-sectional view of turbine exhaust case 40 taken along line 3-3 shown in FIG. 2A that illustrates the cooling architecture of TEC 40.

As described with respect to FIGS. 2A and 2B, frame 42 includes outer ring 48, inner ring 50, and a plurality of struts 52 connecting outer ring 48 to inner ring 50. Fairing 46 includes fairing outer ring 54, fairing inner ring 56 and fairing strut 58. The components making up fairing 46 define the gas path through which hot gas from the combustor flows, and provide thermal insulation for outer ring 48, inner ring 50 and struts 52, which are disposed within hollow fairing struts 58. Bearing assembly 60 is disposed radially inward of inner ring 50 to support a rotor assembly (not shown) and to communicate loads from the rotor assembly to inner ring 50. Struts 52 are connected to both inner ring 50 and outer ring 48, and therefore communicate loads from inner ring 50 to outer ring 48. Passage/tube 62 extends through outer ring 48, strut 52, and inner ring 50 for attachment to bearing assembly 60.

To mitigate the effect of high gaspath temperatures, the present invention utilizes a triple-pass cooling architecture in which cooling airflow is directed in a serpentine path through TEC 40 to provide cooling to a number of components. The flow of air is indicated by arrows, and described with respect to particular locations, including locations 70, 71, 74, 76, and 78. The arrows are provided to aid in understanding the general flow of air, but are not meant to be representative of the actual path the cooled air takes within TEC 40. Cooled airflow C is supplied by an external source, such as a heat exchanger, to an outer diameter of outer ring 48 and is directed radially inward via tube/passage 62. Cooled airflow C is expelled at a radial inward end of tube/passage 62 into an ID cavity 68 formed between inner ring 50 and bearing assembly 60. In the embodiment shown in FIG. 3, two or more holes are provided in tube/passage 62 to expel air into ID cavity 68. The flow of cooling air C through tube/passage 62 represents a first pass of the triple-pass cooling architecture. In addition, second airflow P is supplied via an inner diameter path into ID cavity 68 for mixing with cooled airflow 64. The resulting mixed airflow M (represented at point 70) is directed radially outward through the hollow portion of struts 52 to provide cooling to struts 52. The flow of mixed air M radially outward through struts 52 represents a second pass of the triple-pass cooling architecture. A plurality of apertures/holes 53 allow the mixed airflow to exit at the top of struts 52 into an outer diameter (OD) cavity formed between outer ring 48 and fairing outer ring 54 (not visible in this view, but represented by point 74) to provide cooling to outer ring 48. The size of apertures/holes 53 determines the rate at which cooling airflow is provided to the OD cavity. The mixed airflow M is then directed radially inward via the hollow fairing struts 58. Although not visible in this view, mixed airflow M provided to the OD cavity is communicated via openings 59 in fairing struts 58, which open to the OD cavity as shown in FIG. 2B. The flow of mixed air M provided through fairing struts 58 is directed into the space (shown in FIG. 4) between fairing struts 58 and struts 52 to provide additional cooling to both struts 52 and fairing struts 58. The flow of mixed air M radially inward through hollow fairing struts 58 represents the third pass of the triple-pass cooling architecture.

The mixed airflow M is then provided to chamber 78 located between fairing inner ring 56 and inner ring 50, where it provides cooling to components associated with inner ring 50. The mixed airflow is then directed in an aft direction toward exit 80, where the mixed airflow is combined with exhaust gas within the gas path to provide cooling to components downstream of TEC 40.

In one embodiment, second airflow 66 is provided from one of the compressor stages of gas turbine engine 10. In addition, in at least one embodiment, second airflow 66 is provided at a pressure that is greater than the pressure of cooling airflow 64. As a result, the mixed airflow has a pressure that is higher than would result if only cooling airflow was provided to inner chamber 68. The increased pressure of the mixed airflow results in an outflow margin that is sufficient to drive cooling airflow through the desired serpentine path. In addition, second airflow 66 may normally be simply vented out of gas turbine engine 10 and therefore wasted. The present invention utilizes the bleed air provided by the compressor stage to increase the outflow margin of the cooling airflow.

Exit 80 determines the rate at which mixed airflow exits into the gas path. In one embodiment, exit 80 including one or more metering holes that determine the rate at which mixed airflow exits into the gas path. In another embodiment, exit 80 is a seal that allows mixed airflow to exit into the gas path at a determined rate. In both embodiments, exit 80 is designed to act as a pressure sink. That is, exit 80 will have a lower pressure than other portions of the serpentine cooling path. This ensures that cooling airflow moves in the direction desired through the serpentine path.

In this way, the serpentine path of the cooling/mixed airflow provides cooling to a plurality of components, including struts 52, outer ring 48, fairing struts 58, and inner ring 42. The serpentine path is referred to as triple-pass cooling, because cooling airflow is first directed radially inward (first pass) via tube 62 for mixing in inner chamber 68. Mixed air is then directed radially outward (second pass) to cool struts 52 and outer ring 48. Finally, mixed air is directed radially inward (third pass) to cool struts 52, fairing struts 58, and inner ring 50. A benefit of this architecture, is it allows frame 42, including outer ring 48, inner ring 50 and struts 52 to be manufactured using a casting process that is less-expensive, but results in materials having lower temperature thresholds.

Figure 4:
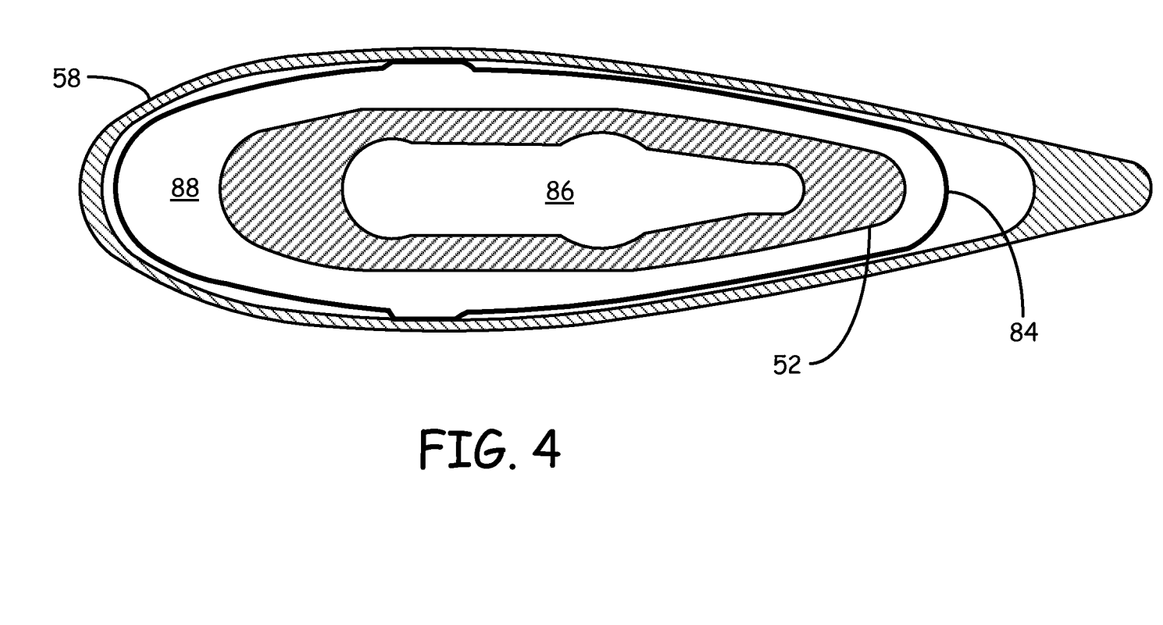
FIG. 4 is a top cross-sectional view that illustrates location of the hollow strut and heat shield within the hollow fairing according to an embodiment of the present invention.

FIG. 4 is a cross-sectional view that illustrates location of fairing strut 58 relative to hollow strut 52 according to an embodiment of the present invention. FIG. 4 also illustrates the location of heat shield 84 (not shown in FIG. 3) relative to hollow strut 52 and hollow fairing strut 58.

Heat shield 84 provides an additional layer of thermal protection for hollow strut 52. In addition to heat shield 84 shown in FIG. 4, additional heat shield members may be located between outer ring 48 and fairing outer ring 54, and between inner ring 50 and fairing inner ring 56.

In the view shown in FIG. 4, hollow portion 86 within hollow strut 52 is clearly shown. Passage 62 (shown in FIG. 3) would extend through hollow portion 86, and mixed airflow directed from ID cavity 68 (shown in FIG. 3) would also be directed in a radially outward direction through hollow portion 86, although separated from the cooling airflow by passage/tube 62. Mixed airflow provided through hollow portion 86 provides cooling to strut 52. Hollow portion 88 is illustrated in the space between hollowing fairing strut 58 and strut 52. Mixed airflow is directed radially inward from an OD cavity through hollow portion 88 to provide cooling both to fairing strut 58 as well as strut 52.

The following are non-exclusive descriptions of possible embodiments of the present invention.

A method of cooling a turbine exhaust case (TEC) employed in an industrial gas turbine engine includes supplying cooling airflow from an outer diameter (OD) to an inner diameter (ID) cavity, supplying a secondary airflow having a pressure greater than the pressure of the cooling airflow to the ID cavity for mixing with the cooling airflow to provide a mixed airflow, and directing the mixed airflow in a serpentine cooling path that includes first directing the mixed airflow radially outward via hollow struts to an OD cavity, then radially inward via hollow fairings that surround the hollow struts.

The method of the preceding paragraph can optionally include, additionally and/or alternatively, any one or more of the following features, configurations and/or additional components:

wherein directing the mixed airflow further includes exhausting the airflow provided radially inward via the hollow fairings in an aft direction for rejoinder with gaspath airflow; and wherein exhausting the airflow in the aft direction for rejoinder with the gaspath airflow provides a low-pressure sink that maintains direction of mixed airflow radially outward via the hollow struts and then radially inward via the hollow fairings.

A cooling architecture for a turbine exhaust case (TEC) employed in an industrial gas turbine engine includes a passage for directing cooling airflow radially inward through the TEC. An inner diameter (ID) cavity mixes the cooling airflow with a secondary airflow. A serpentine cooling path directs the mixed airflow radially outward via hollow struts and then radially inward via hollow fairings that surround the hollow struts.

The cooling architecture of the preceding paragraph can optionally include, additionally and/or alternatively, any one or more of the following features, configurations and/or additional components:

wherein the serpentine cooling path further includes an exhaust portion that exhausts airflow provided radially inward via the hollow fairings in an aft direction for combination with the gaspath;

wherein the exhaust portion is a low pressure sink that maintains circulation of the mixed airflow in a desired direction;

wherein the exhaust portion includes a seal and/or metering plate to exhaust the mixed airflow at a desired rate;

wherein the secondary airflow has a pressure greater than the cooling airflow;

wherein the secondary airflow is bleed air supplied from a compressor stage;

wherein the cooling airflow is provided by an external heat exchanger;

wherein the ID cavity is defined between the inner ring and a bearing compartment; and a heat shield located between the hollow fairing struts and the hollow struts.

A turbine exhaust case (TEC) employed in an industrial gas turbine engine comprises an frame structure that includes an outer ring, an inner ring disposed radially inward of the outer ring, and a plurality of hollow struts that connect the outer ring to the inner ring, wherein an inner diameter (ID) cavity is formed between the inner ring and a bearing compartment disposed radially inward of the inner ring. The TEC further includes a fairing portion that includes a fairing outer ring, a fairing inner ring, and a plurality of hollow fairing struts that surrounds each of the plurality of hollow struts. A passage/tube is located within at least one of the plurality of hollow struts for directing cooling airflow radially inward to the ID cavity. A second passage is located radially inward of the ID cavity, which directs pressurized airflow into the ID cavity for mixing with the cooling airflow. A serpentine cooling path directs the mixed airflow radially outward through the hollow strut to an outer diameter (OD) cavity formed between the outer ring and the fairing outer ring, and then radially inward through the hollow fairing strut.

The TEC of the preceding paragraph can optionally include, additionally and/or alternatively, any one or more of the following features, configurations and/or additional components:

wherein a pressure of the pressurized airflow is greater than a pressure of the cooling airflow, and wherein a pressure of the mixed airflow is greater than the pressure of the cooling airflow;

wherein the passage is a tube that extends from the outer ring, through the hollow strut and inner ring, for attachment to a top portion of the bearing compartment;

wherein the tube includes a plurality of apertures for communicating cooling airflow into the ID cavity for mixing with the pressurized airflow;

an exhaust portion located on an aft side of the TEC that exhausts the mixed airflow into a gaspath;

wherein the exhaust portion is a pressure sink that is at a lower pressure than a pressure of the mixed airflow mixed in the ID cavity; and a heat shield located between the hollow fairing struts and the hollow struts.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of cooling a turbine exhaust case (TEC) employed in an industrial gas turbine engine, the method comprising:

supplying cooling airflow from an outer diameter (OD) to an inner diameter (ID) cavity by directing the cooling airflow through a tube disposed inside of a hollow strut that extends between an outer ring and an inner ring of the TEC;

supplying a secondary airflow having a pressure greater than the pressure of the cooling airflow to the ID cavity for mixing with the cooling airflow to provide a mixed airflow; and directing the mixed airflow in a serpentine cooling path that includes first directing the mixed airflow radially outward inside the hollow strut to an OD cavity formed between the outer ring of the TEC and a fairing outer ring disposed radially inward of the outer ring of the TEC, then radially inward between the hollow strut of the TEC and a hollow fairing strut that surrounds the hollow strut.

2. The method of claim 1, wherein directing the mixed airflow further includes exhausting the airflow provided radially inward between the hollow strut of the TEC and the hollow fairing strut in an aft direction for rejoinder with a gaspath airflow.

3. The method of claim 2, wherein exhausting the airflow in the aft direction for rejoinder with the gaspath airflow provides a low-pressure sink that maintains direction of the mixed airflow radially outward inside the hollow strut and then radially inward between the hollow strut and the hollow fairing strut.

4. A cooling architecture for a turbine exhaust case (TEC) employed in an industrial gas turbine engine, the cooling architecture comprising:

a passage for directing cooling airflow radially inward through the TEC, wherein the passage is formed inside a hollow strut that extends between an outer ring and an inner ring of the TEC;

an inner diameter (ID) cavity disposed radially inward from the inner ring of the TEC that mixes the cooling airflow with a secondary airflow to form a mixed airflow; and a serpentine cooling path that directs the mixed airflow radially outward inside the hollow strut and outside of the passage, and then radially inward between the hollow strut of the TEC and a hollow fairing strut that surrounds the hollow strut of the TEC.

5. The cooling architecture of claim 4, wherein the serpentine cooling path further includes an exhaust portion that exhausts airflow provided radially inward between the hollow strut if the TEC and the hollow fairing strut in an aft direction for combination with a gaspath.

6. The cooling architecture of claim 5, wherein the exhaust portion is a low pressure sink that maintains circulation of the mixed airflow in a desired direction.

7. The cooling architecture of claim 5, wherein the exhaust portion includes a seal and/or metering plate to exhaust the mixed airflow at a desired rate.

8. The cooling architecture of claim 4, wherein the secondary airflow has a pressure greater than the cooling airflow.

9. The cooling architecture of claim 4, wherein the secondary airflow is bleed air supplied from a compressor stage.

10. The cooling architecture of claim 4, wherein the cooling airflow is provided by an external heat exchanger.

11. The cooling architecture of claim 4, wherein the ID cavity is defined between the inner ring and a bearing compartment.

12. The cooling architecture of claim 4, further including:
a heat shield located between the hollow fairing strut and the hollow strut of the TEC.

13. A turbine exhaust case (TEC) employed in an industrial gas turbine engine comprising:

a frame portion that includes an outer ring, an inner ring disposed radially inward of the outer ring, and a hollow strut connecting the outer ring to the inner ring, wherein an inner diameter (ID) cavity is formed between the inner ring and a bearing compartment disposed radially inward of the inner ring;

a fairing portion that includes a fairing outer ring, a fairing inner ring disposed radially inward of the fairing outer ring, and a hollow fairing strut that connects the fairing outer ring to the fairing inner ring, wherein the hollow fairing strut surrounds the hollow strut;

a passage located within the hollow strut that directs cooling airflow radially inward to the ID cavity;

a second passage located radially inward of the ID cavity that directs pressurized airflow into the ID cavity for mixing with the cooling airflow to form a mixed airflow; and a serpentine cooling path that directs the mixed airflow radially outward inside the hollow strut to an outer diameter (OD) cavity formed between the outer ring and the fairing outer ring, and then radially inward between the hollow fairing strut and the hollow strut.

14. The TEC of claim 13, wherein a pressure of the pressurized airflow is greater than a pressure of the cooling airflow, and wherein a pressure of the mixed airflow is greater than the pressure of the cooling airflow.

15. The TEC of claim 13, wherein the passage is a tube that extends from the outer ring, through the hollow strut and inner ring, for attachment to a top portion of the bearing compartment.

16. The TEC of claim 15, wherein the tube includes a plurality of apertures for communicating cooling airflow into the ID cavity for mixing with the pressurized airflow.

17. The TEC of claim 13, further including:
an exhaust portion located on an aft side of the TEC that exhausts the mixed airflow into a gaspath.

18. The TEC of claim 17, wherein the exhaust portion is a pressure sink that is at a lower pressure than a pressure of the mixed airflow mixed in the ID cavity.

19. The TEC of claim 13, further including:
a heat shield located between the hollow fairing strut and the hollow strut.

* * * * *